May 28, 1946. B. L. EVERING ET AL 2,400,922
HYDROCARBON CONVERSION SYSTEM
Filed Aug. 13, 1942
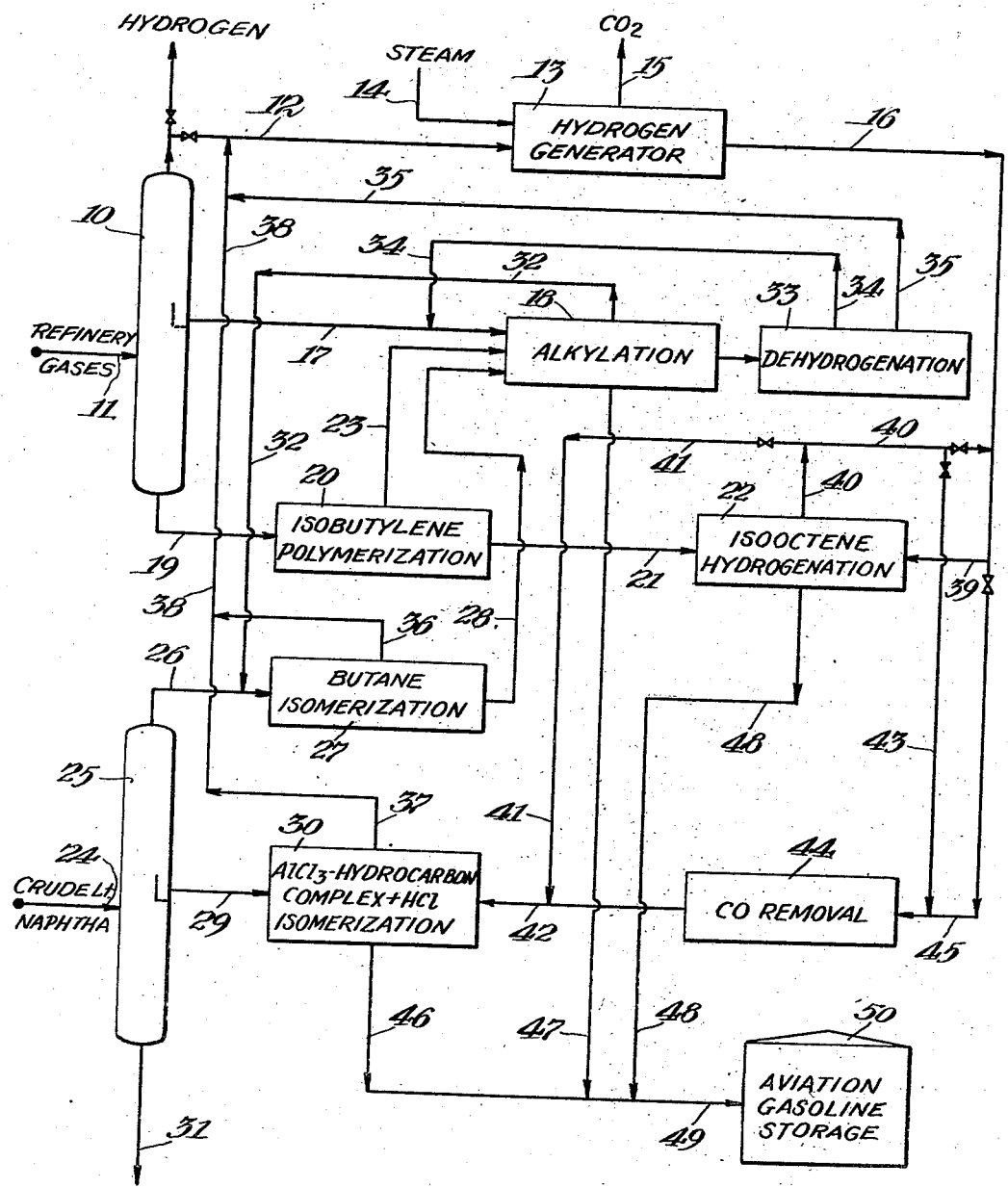
Inventors:
Bernard L. Evering,
Edmond L. d'Ouville
By Donald E. Payne
Attorney Patented May 28, 1946

2,400,922

UNITED STATES PATENT OFFICE 2,400,922

HYDROCARBON CONVERSION SYSTEM

Bernard L. Evering and Edmond L. d'Ouville, Chicago, Ill., assignors to Standard Oil Company, Chicago, Ill., a corporation of Indiana Application August 13, 1942, Serial No. 454,652

2 Claims. (Cl. 260—683.4)

This invention relates to a new and improved hydrocarbon conversion system and it pertains more particularly to an improved integration of such system for utilizing low boiling hydrocarbons for the manufacture of a balanced high quality aviation fuel.

An object of our invention is to provide an improved system for utilizing hydrocarbons having less than seven carbon atoms per molecule for the production of balanced high quality aviation fuel. A further object is to provide a new and improved combination and integration of steps which per se are already known in the art in order to utilize the various components of the light hydrocarbons more effectively and to produce maximum yields of a superior aviation gasoline with minimum overall capital investment and operating costs.

A further object of our invention is to provide a new and improved method of generating, purifying and utilizing hydrogen in conjunction with the isomerization of pentanes and hexanes. Other objects will be apparent as the detailed description of the invention proceeds.

Heretofore it has been thought that carbon monoxide was not deleterious to aluminum chloride catalysts. We have discovered however that, particularly for the isomerization of pentanes and hexanes by an aluminum chloride-hydrocarbon complex in the presence of hydrogen chloride wherein hydrogen is added and consumed in the isomerization process, even small amounts of carbon monoxide are extremely detrimental. Carbon monoxide not only causes a marked and rapid decline in the activity of the isomerization catalyst but in a short time it poisons such catalyst to such an extent that it is relatively inactive.

In the hydrogenation of isooctene to isooctane the hydrogenation catalyst is not affected by small amounts of carbon monoxide and most of the carbon monoxide is simply hydrogenated along with the isooctene so that while the hydrogen gas charged to an isooctene hydrogenation step may contain as much as 2 to 4% carbon monoxide, the "recycled" hydrogen leaving this isooctene hydrogenation step will only contain about .2 to .3% carbon monoxide. For isomerization of $C_5$ and $C_6$ hydrocarbons by means of an aluminum chloride-hydrocarbon complex, however, the hydrogen containing as much as 2% carbon monoxide rapidly poisons the catalyst and renders the catalyst relatively inactive. Even the presence of .3% carbon monoxide in the hydrogen stream materially lowers the activity of the isomerization catalyst. An important feature of our invention is the substantially complete removal of carbon monoxide from the hydrogen which is generated in the system so that the carbon monoxide content of the hydrogen stream charged to the isomerization system will contain less than 1% and preferably less than about .3% of carbon monoxide.

The hydrogen for our system is preferably generated by reaction of methane or other relatively noncondensible hydrocarbon gases with steam at high temperatures in the presence of suitable conversion catalysts followed by catalytic oxidation of carbon monoxide to carbon dioxide and caustic scrubbing to remove $CO_2$. Since hydrogen produced in this manner usually contains about 2 to 4% of carbon monoxide it is not suitable for use in the isomerization step. However, it may be employed for the hydrogenation of isooctene and the off-gas from the isooctene hydrogenation may be employed for aluminum chloride isomerization. Even this gas, however, contains sufficient carbon monoxide to be detrimental in the isomerization step and we therefore prefer to include another carbon monoxide removal step prior to the introduction of the hydrogen into the isomerization system. The removal of carbon monoxide from the hydrogen stream may be effected by scrubbing the stream with an ammoniacal copper chloride solution or any other suitable absorbent or adsorbent for carbon monoxide, it may be removed by scrubbing the incoming hydrogen stream with spent aluminum chloride-hydrocarbon complex or it may be removed by any known means. No invention is claimed in the particular means for removing the carbon monoxide, the important feature being the use of such means in the combination of steps hereinabove briefly described and hereinafter described in more detail.

The invention will be more clearly understood from the following detailed description read in conjunction with the accompanying drawing which schematically illustrates a flow diagram of our improved system.

Our invention utilizes both the saturated and unsaturated normally gaseous hydrocarbons and it utilizes saturated $C_5$ and $C_6$ hydrocarbons such as pentanes, hexanes and their associated naphthenes. The normally gaseous hydrocarbons ranging from methane to butanes may be obtained from crude petroleum and various refining operations, particularly from thermal and catalytic cracking. Ordinary refinery gas streams usually contain substantial amounts of both saturated and unsaturated hydrocarbons and conventional refinery gas streams are, therefore, a preferred source of the $C_1$ to $C_4$ hydrocarbons. The $C_5$ and $C_6$ hydrocarbons are preferably obtained from crude light naphtha from which lighter and heavier hydrocarbons are removed by simple fractionation. Fractionation of the hydrocarbons may be effected by any known means. In the accompanying drawing the fractionation of the $C_1$ to $C_4$ hydrocarbons is schematically illustrated by fractionating column 10 into which refinery gases are introduced through line 11 but it should be understood that any known absorption system, rectification system, or the like may be employed instead of a simple tower.

The dry gas fraction consisting essentially of methane but possibly containing hydrogen, ethane, ethylene, etc., is removed from the system through line 12 and charged to hydrogen generation unit 13 along with steam introduced through line 14. In the hydrogen generation unit the incoming gases may be freed from deleterious sulfur compounds, heated with steam to a temperature of about 1500 to 1600° F., cooled to a temperature of about 900° F. and contacted in the presence of additional steam with a known conversion catalyst (such as Hopcalite) for effecting the reaction $CO+H_2O \rightarrow CO_2+H_2$. The carbon dioxide formed in the heating (reformer furnace) and conversion steps may then be removed by scrubbing with diamino isopropenol or caustic solution or the carbon dioxide may be removed from the hydrogen in any other conventional manner. The hydrogen generation unit is of the type used for producing commercial hydrogen required for hydrogenating isooctene and since such units are well known in the art (see United States Patent 1,904,592) a more detailed description thereof is unnecessary. In the drawing I have illustrated the removal of carbon dioxide through line 15 and the removal of hydrogen through line 16. This hydrogen will usually contain about 2 to 5% carbon monoxide.

The $C_2$ and particularly $C_3$ hydrocarbons may be recovered from fractionation system 10, through line 17 and introduced into an alkylation unit 18. The alkylation may be effected by means of concentrated sulfuric acid at about 40 to 100° F. or it may be effected by means of an aluminum chloride-hydrocarbon complex at a temperature of about 50 to 200° F. Since such alkylation systems are well known in the art a further description of alkylation unit 18 is unnecessary.

The $C_4$ hydrocarbons may be recovered from the fractionation system 10 through line 19 and introduced into a butylene polymerization unit 20. In this unit the gases may be scrubbed with caustic, dried in a salt drum and then contacted with a catalyst comprising phosphoric acid on clay pellets in long narrow vertical tubes, the polymerization being effected at a pressure of about 600 to 800 pounds per square inch and at a temperature of about 300 to 600° F. Alternatively, the polymerization may be effected with sulfuric acid at slightly lower concentration than that employed for alkylation. Such polymerization processes for converting isobutylene to isooctene are well known in the art and further detailed description of polymerization unit 20 is, therefore, unnecessary. The isooctene from the polymerization unit is introduced by line 21 into hydrogenation unit 22. Unpolymerized $C_4$ hydrocarbons from the polymerization unit 20 may be introduced through line 23 to alkylation unit 18.

A crude light naphtha from line 24 is fractionated in column 25, the butane being taken overhead through line 26 to a butane isomerization unit 27. In this unit the butane may be contacted with aluminum chloride supported on a clay support or it may be contacted with aluminum chloride-hydrocarbon complex at temperatures of the order of 100 to 300° F., preferably in the presence of a hydrogen halide activator but in the absence of added hydrogen. Such butane isomerization systems are well known in the art and a detailed description of the unit is, therefore, unnecessary. Isomerization products from this unit may be introduced from line 28 to alkylation unit 18.

The $C_5$ and $C_6$ hydrocarbons along with the associated naphthenes boiling below about 150 to 175° F. are removed from the fractionating column 25 through line 29 to isomerization unit 30 which preferably employs an aluminum chloride hydrocarbon complex activated by hydrogen chloride. Catalyst life and catalyst activity are maintained in this process by the addition of hydrogen of sufficient purity, in sufficient amounts and under sufficient pressure to accomplish these results without materially inhibiting the isomerization reaction. The isomerization unit may include a hydrogen chloride absorber, one or more reaction towers connected in series or in parallel, catalyst separation and recycling means, means for returning gases from reaction products to the hydrogen chloride scrubber, means for neutralizing the product stream and effluent gases, means for adding makeup catalyst, means for recovering valuable components from spent catalysts, etc. Such a system is illustrated in issued patents as well as in copending applications and is now known to those skilled in the art so that a detailed description of this unit is unnecessary. A charging stock to isomerization unit 30 is preferably a $C_5$-$C_6$ fraction of crude light naphtha the heavier fractions being withdrawn from fractionating column 25 through line 31.

Unreacted hydrocarbons from alkylation unit 18 may be fractionated so that the $C_4$ fraction may be introduced through line 32 to butane isomerization unit 27 and the lighter gases may either be introduced directly to hydrogen generation unit 13 or to a dehydrogenation unit 33. The dehydrogenation may be effected by means of a VIth group oxide mounted on active alumina at a temperature of the order of 800 to 1100° F. and since such dehydrogenation is well known to those skilled in the art a detailed description of this unit is unnecessary. The $C_2$-$C_4$ or $C_3$-$C_4$ fraction from the dehydrogenation unit may be returned through line 34 to alkylation unit 18.

In the dehydrogenation unit as well as in the butane isomerization and $C_5$-$C_6$ isomerization units a certain amount of hydrogen and/or light hydrocarbons may be produced or recovered but since the hydrogen is contaminated by light hydrocarbons it is not suitable for use in the hydrogenation unit 22 or isomerization unit 30. The hydrogen-light hydrocarbon gas mixture from dehydrogenation unit 33, butane isomerization unit 27 and $C_5$-$C_6$ isomerization unit 30 are, therefore, introduced through lines 35, 36, and 37 respectively into line 38 which leads to line 12 and hydrogen generation unit 13. The contaminating light hydrocarbons are converted into hydrogen in hydrogen generation unit 13 and the hydrogen which leaves the generator through line 16 is substantially free from hydrocarbon contaminants.

This hydrogen from line 16 is introduced through line 39 to a high pressure hydrogenation unit 22 for converting the isooctene into isooctane, preferably in the presence of a sulfur resistant catalyst and at low space velocities. The hydrogenation of isooctene is of course well known to those skilled in the art and unit 22 needs no detailed description.

The hydrogen leaving hydrogenation unit 22 contains only about .2 to .3% of carbon monoxide while the hydrogen introduced to the unit contains from about 2 to 5% carbon monoxide. This phenomenon may be effectively utilized as a step in the removal of carbon monoxide from the generated hydrogen to make it suitable for use in the $C_5$–$C_6$ isomerization unit. A part of the hydrogen from hydrogenation unit 22 may be recycled to said unit through line 40. Another part of the hydrogen from hydrogenation unit 22 may be introduced through line 41 and line 42 directly to isomerization unit 30 or may be introduced through line 43, carbon monoxide removal system 44 and line 42 to isomerization unit 30. Considerably less carbon monoxide will have to be removed from hydrogen introduced into system 44 through line 43 than would have to be removed from hydrogen introduced from line 16 and line 45 into the carbon monoxide removal system.

We have discovered that even small amounts of carbon monoxide in a hydrogen stream materially lower the activity of the isomerization catalyst in unit 30 and it has been found that when the hydrogen introduced at the base of an isomerization reactor tower contains as much as 1 or 2% of carbon monoxide the catalyst in the tower soon becomes poisoned to such an extent that its activity is nil. Where the hydrogen from this unit is generated from hydrocarbons and hence associated with carbon monoxide it is, therefore, essential that this carbon monoxide be removed from the hydrogen which is to be used for maintaining catalyst activity and prolonging catalyst life in isomerization unit 30. The carbon monoxide content of the hydrogen charged to unit 30 must certainly be below about 1%, should preferably be below .3%, and should be as nearly eliminated as possible or is economically feasible. The carbon monoxide removal system 44 may be a simple scrubber utilizing an ammoniacal copper chloride solution or other conventional scrubbing liquid for substantially eliminating the carbon monoxide content. No invention is claimed in any particular method of carbon monoxide removal since such methods are so well known to those skilled in the art that they need no detailed description. Heretofore, however, no one skilled in the art has appreciated the fact that carbon monoxide must necessarily be removed from the hydrogen produced from hydrocarbons and steam, and a feature of our invention is the inclusion of such a carbon monoxide removal step in the unitary and integrated combination of steps hereinabove described.

As above pointed out, hydrogenation unit 22 serves the role of a carbon monoxide removal unit in that it decreases the carbon monoxide content of hydrogen generated in generator 13 from about 2 to 5%, down to about .2 to .3%. The hydrogen leaving unit 22 through line 41 may thus be employed in isomerization unit 30, particularly when the hydrogen is first contacted with spent complex leaving a reactor tower so that any residual carbon monoxide in the hydrogen may be scrubbed out of the hydrogen by the spent complex before the hydrogen contacts active complex in the main part of the isomerization reaction zone. Spent aluminum chloride-hydrocarbon complex may thus be a scrubbing agent employed for removing carbon monoxide from the hydrogen introduced into isomerization unit 30, the removal of such carbon monoxide from the hydrogen stream being effected in system 44.

The isomerization product or isomate leaves unit 30 through line 46. The alkylation product or alkylate leaves unit 18 through line 47. Isooctane leaves hydrogenation unit 22 through line 48. These three streams may be blended in line 49 and conveyed to aviation gasoline storage tank 50. The resulting product is a remarkably superior aviation fuel since it is of balanced volatility, is substantially saturated, is characterized by a high heat content and a low acid heat number and is characterized by an extremely high knock rating.

From the above description it will be seen that we have provided a new and improved unitary system for converting normally gaseous saturated and unsaturated hydrocarbons and $C_5$ and $C_6$ saturated hydrocarbons into paraffinic hydrocarbons of highly branched-chain structure and boiling almost entirely within the aviation motor fuel boiling range. We obtain a maximum yield of an aviation fuel of maximum quality and each component of the original charging stock is used with maximum effectiveness. More specifically we have provided a new and integrated system of generating, purifying and utilizing hydrogen in this process and we have provided a method and means whereby hydrogen produced from hydrocarbons and steam may be safely and effectively used for prolonging catalyst life and maintaining catalyst activity in a $C_5$–$C_6$ saturated hydrocarbon isomerization system. It should be understood, however, that the invention is not limited to all of the details hereinabove set forth since certain of the recited steps will in some instances be unnecessary and since many modifications and alternative operations and operating conditions will be apparent from the above description to those skilled in the art.

We claim:

1. The method of increasing the yield of high antiknock aviation gasoline stocks from light paraffinic hydrocarbons which method comprises fractionating said hydrocarbons to obtain a light normally gaseous fraction, a heavy normally gaseous fraction and a light normally liquid fraction, reacting said light normally gaseous fraction with steam for the production of hydrogen contaminated with carbon monoxide, polymerizing hydrocarbons in said heavy normally gaseous fraction to produce a polymer of the aviation motor fuel boiling range, hydrogenating said polymer with said hydrogen under conditions for effecting a substantial reduction in the carbon monoxide content of the unconsumed hydrogen, isomerizing the light normally liquid hydrocarbons with a halide isomerization catalyst under isomerization conditions in the presence of added hydrogen and under a substantial hydrogen pressure, utilizing at least a portion of the unconsumed hydrogen from the hydrogenation step for supplying the added hydrogen to said isomerization step, and blending hydrogenated polymer and isomerized light normally liquid hydrocarbons from the hydrogenating and isomerizing steps respectively to produce high antiknock aviation gasoline stocks.

2. The method of claim 1 which includes the further steps of isomerizing normal butane from said heavy normally gaseous fraction, to form isobutane, alkylating said isobutane with a normally gaseous olefin to increase the production of high knock rating aviation fuel stocks, dehydrogenating paraffinic hydrocarbons from said heavy normally gaseous fraction, introducing olefins from said dehydrogenation step to said alkylation step, introducing hydrogen-containing gases from said dehydrogenation step to said hydrogen producing step, and blending aviation fuel stocks from the alkylating step with hydrogenated products from the hydrogenating step and isomerization products from the isomerization step.

BERNARD L. EVERING.
EDMOND L. D'OUVILLE.